United States Patent Office 3,600,189
Patented Aug. 17, 1971

3,600,189
ANIMAL FEED SUPPLEMENT
Armando R. Raynal, Chihuahua, Chihuahua, Mexico, assignor to Alicia Raynal de Zea, Patricia Raynal de Prado and Rosa I. Raynal, fractional part interest to each
No Drawing. Filed May 24, 1968, Ser. No. 731,719
Int. Cl. A23k 1/02
U.S. Cl. 99—6
4 Claims

ABSTRACT OF THE DISCLOSURE

A pulverulent animal feed supplement which may be fed free choice which comprises particular proportions of urea, calcium-phosphorous dietary supplement, sodium chloride, calcium carbonate, non-fermented or fermented molasses, dehydrated alfalfa, sulfur, trace elements and vitamin A which supplement in addition to providing an additional approximately 1% protein to the diet of ruminants eating substantially grass, creates a rumen flora that has been found to keep the cattle in good shape on a 6% protein diet.

The present invention relates to the provision of an animal feed supplement which may be fed free choice. More particularly, the present invention relates to a pulverulent urea-containing free choice animal feed supplement for the upgrading of the nutrition of ruminants subsisting primarily on grass, particularly during seasonal periods when the grass mainstay of the diet is of somewhat less than optimum nutritional analysis.

It is a primary object of the present invention to provide a pulverulent urea-containing feed supplement for ruminants subsisting primarily on a diet of low protein analysis grass and wherein the free choice feeding of the feed supplement provides additional necessary protein and other components necessary for proper nutrition as well as creating a rumen flora that materially assists in keeping the ruminants in nutritionally sound condition by a relatively low protein analysis diet.

Briefly, the pulverulent animal feed supplement formulated in accordance with the present invention comprises urea, a calcium-phosphate dietary supplement (such as derived from steamed bone meal or tribasic calcium phosphate), sodium chloride, calcium carbonate, molasses (either fermented or nonfermented), dehydrated alfalfa, sulfur, trace elements (molybdenum, copper, iron, cobalt which are exemplary of trace elements necessary for animal nutrition), and vitamin A.

The urea utilized is of feed grade which generally, although not necessarily, has a nitrogen analysis of about 42% and is generally of a powdery nature. The calcium-phosphate component of the supplement is preferably derived from steamed bone meal produced by grinding animal bones which have been previously steamed under pressure and wherein it is understood an average analysis thereof indicates 2–3% ammonia, 20–25% phosphoric acid and 50–55% bone phosphate, which bone phosphate consists of tribasic calcium phosphate. Thus, appropriate compensation for the percentage of tribasic calcium phosphate, in the source thereof utilized, must be made when formulating the animal feed supplement comprising the present invention. In addition mineral tribasic calcium phosphate, per se, may be utilized. The sodium chloride may comprise any grade suitable for use in animal feed. The calcium carbonate utilized may be derived from precipitated or prepared chalk and is preferably of approximately 35 mesh Tyler Standard while the sulfur and trace elements are preferably of a veterinary or pharmaceutical grade and the vitamin A utilized of a U.S.P. The dehydrated alfalfa utilized preferably comprises a low temperature dried comminuted alfalfa with a sufficient amount of the moisture content removed to preclude the significant deterioration thereof during storage. Dehydrated alfalfa of the aforementioned type is generally characterized by a moisture content of approximately 8–10%. As indicated hereinabove, the animal feed supplement of the present invention include a minor proportion of molasses primarily to permit the palatability of the feed supplement to be selectivity varied in a predetermined manner whereby it is possible to indirectly control the amount of the feed supplement that an animal will eat on a daily basis if permitted to feed free choice. It will be understood that the molasses utilized may be derived from cane or beet sugar of a feed grade, which for example, is preferably, although not necessarily, of approximately 85° Brix. In addition, to facilitate handling of the "molasses" component of the present animal feed supplement, if desired, the "molasses" component may comprise 85° Brix molasses fermented at a temperature of approximately 18° to 20° C. wherein the molasses is diluted with two parts of water by volume and the alcoholic fermentation thereof permitted to go to completion followed by the addition of six parts of unfermented 85° Brix molasses, which molasses fortified ferment may then be utilized in lieu of straight unfermented 85° Brix molasses, although it will be understood that for a comparable palatability it may be desirable to use slightly more of the fermented molasses than is necessary when using unfermented molasses.

A significant aspect of the proportional relationship of certain of the components of the present animal feed supplement resides in the ratio of the tricalcium phosphate to the urea which ranges from approximately 3:1 to approximately 1:1, with the preferred ratio of tricalcium phosphate to urea being approximately 2:1. In addition, in order to preclude an abnormally high pH of the urine of ruminants free feeding the animal feed supplement, it has been found preferable to vary the amount of calcium carbonate utilized in proportion to the molasses component, and if necessary, omit the calcium carbonate if it becomes necessary to reduce the cations. Generally, for approximately 800 parts by weight of the completed feed supplement utilizing 80 parts of the molasses component, the calcium carbonate would be eliminated. Thereafter, for each incremental 1 part increase in the molasses component the calcium carbonate will be increased at an increment of approximately 7.5 parts.

As will become more apparent hereinafter, for a batch of the animal feed supplement comprising, for example, approximately 1,177 parts by weight, exclusive of the vitamin A utilized, the molasses component will be present in the order of approximately 100 parts and the calcium carbonate present in the order of approximately 150 parts.

The following examples are included to more specifically illustrate exemplary animal feed supplements produced in accordance with the present invention.

EXAMPLE I

Urea—150 kilograms
Tribasic calcium phosphate (steamed bone meal)—300 kilograms
Sodium chloride—225 kilograms
Calcium carbonate—150 kilograms
Molasses—100 kilograms
Dehydrated alfalfa—70 kilograms
Sulfur—25 kilograms
Trace elements—7 kilograms
Vitamin A—163,000,000 International Units The molasses component set forth herein was prepared by diluting 1 part of 85° Brix molasses with two of water, which underwent alcoholic fermentation to completion, and was then fortified with 6 additional parts by weight of Brix molasses. On extensive field trials, wherein the feed supplement was fed free choice, cows ate approximately 250 grams per cow per day for two months, and then their daily consumption tapered off to approximately 100 grams per cow per day. When ingesting 250 grams per day, a cow eating grass having a protein content of approximately 5% enriched her protein intake to approximately 6% per day which together with the other components of the feed supplement materially assisted in maintaining a rumen flora that keeps the cow in good shape on a 6% protein ration.

EXAMPLE II

Urea—100 kilograms
Tribasic calcium phosphate—300 kilograms
Sodium chloride—225 kilograms
Calcium carbonate—0 kilogram
Molasses (85° Brix)—80 kilograms
Dehydrated alfalfa—70 kilograms
Sulfur—25 kilograms
Trace elements—7 kilograms
Vitamin A—163,000,000 International Units

EXAMPLE III

Urea—300 kilograms
Tribasic calcium phosphate (steamed bone meal)—300 kilograms
Sodium chloride—225 kilograms
Calcium carbonate—7.5 kilograms
Molasses—81 kilograms
Dehydrated alfalfa—70 kilograms
Sulfur—25 kilograms
Trace elements—7 kilograms
Vitamin A—163,000,000 International Units

EXAMPLE IV

Urea—150 kilograms
Tribasic calcium phosphate—300 kilograms
Sodium chloride—225 kilograms
Calcium carbonate—15 kilograms
Molasses—82 kilograms
Dehydrated alfalfa—70 kilograms
Sulfur—25 kilograms
Trace elements—7 kilograms
Vitamin A—163,000,000 International Units The feed supplements prepared in accordance with Examples II–IV were fed free choice for extended periods of time in field trials and the ruminants so fed were observed to be of sound condition, evidenced appropriate weight gain and the cows were observed to be giving adequate amounts of milk. The aforementioned condition of the ruminants is considered to be indicative of the fact that the feed supplement formulated in accordance with the present invention greatly facilitates the establishment of a rumen flora that materially assists in keeping the animals in good shape on relatively low protein analysis rations.

The foregoing is considered merely exemplary of the practice of the present invention, however, it will be understood that the formulation of Example I will generally comprise a preferred embodiment. In addition, inasmuch as the specific examples set forth hereinabove are merely exemplary, I do not wish to be limited to the exact feed supplements set forth, but only by the scope of the appended claims.

What is claimed as new is as follows:

1. An animal pulverulent feed supplement comprising, on the basis of weight, for each approximately 800 kilogram to 1200 kilogram amount, of approximately 100 to 300 kilograms urea, 300 kilograms of tri-basic calcium phosphate, said calcium-phosphate being present relative to said urea in the ratio range of approximately 3:1 to 1:1, 225 kilograms sodium chloride, 80 to 100 kilograms molasses, calcium carbonate in kilograms amount corresponding to 7.5 kilograms for each kilogram incremental part increase in the molasses above 80 kilograms, 70 kilograms dehydrate alfalfa, 25 kilograms sulfur, 7 kilograms trace elements, and 163,000,000 International Units vitamin A.

2. The composition of claim 1 wherein said calcium-phosphate dietary supplement is derived from a calcium-phosphate containing substance selected from the group consisting of steamed bone meal, tri-basic calcium phosphate, and admixtures thereof.

3. The composition of claim 1 wherein said molasses comprises a molasses fortified molasses ferment.

4. The composition of claim 1 wherein said calcium carbonate and molasses are incorporated in the ratio of 0 kilogram to 80 kilograms respectively and wherein for each additional 1 kilogram of molasses utilized in excess of 80 kilograms approximately 7.5 kilograms of calcium carbonate are utilized.

References Cited

UNITED STATES PATENTS

| | | | |
|---|---|---|---|
| 2,427,520 | 9/1947 | Briod et al. | 99—6 |
| 2,560,830 | 7/1951 | Turner | 99—2 |
| 2,569,282 | 9/1951 | Block | 99—2X |
| 2,808,332 | 10/1957 | Anderson et al. | 99—2N |
| 2,861,886 | 11/1958 | Colby et al. | 99—6X |
| 2,965,488 | 12/1960 | Belasco | 99—2 |
| 3,231,466 | 1/1966 | Hoffman et al. | 167—53 |
| 3,249,441 | 5/1966 | Reynolds et al. | 99—2 |

FOREIGN PATENTS

| | | | |
|---|---|---|---|
| 697,171 | 11/1964 | Canada | 99—6 |

OTHER REFERENCES

"Feedstuffs" June 1960, pp. 55–56, Perry et al., 99–2–N.

NORMAN YUDKOFF, Primary Examiner

F. E. DRUMMOND, Assistant Examiner

U.S. Cl. X.R.

99—2, 8, 11, 204